US008750124B2

(12) United States Patent
Guo

(10) Patent No.: US 8,750,124 B2
(45) Date of Patent: Jun. 10, 2014

(54) METHOD OF RADIO RESOURCE ALLOCATION AND RELATED COMMUNICATION APPARATUS

(75) Inventor: Yu-Hsuan Guo, Taipei (TW)

(73) Assignee: Innovative Sonic Limited, Ebene (MU)

( * ) Notice: Subject to any disclaimer, the term of this patent is extended or adjusted under 35 U.S.C. 154(b) by 1166 days.

(21) Appl. No.: 12/333,308

(22) Filed: Dec. 12, 2008

(65) Prior Publication Data

US 2009/0154430 A1    Jun. 18, 2009

Related U.S. Application Data

(60) Provisional application No. 61/013,309, filed on Dec. 13, 2007, provisional application No. 61/020,751, filed on Jan. 14, 2008.

(51) Int. Cl.
*G01R 31/08* (2006.01)

(52) U.S. Cl.
USPC .................................................. 370/235.1

(58) Field of Classification Search
USPC ................................. 370/235, 235.1
See application file for complete search history.

(56) References Cited

U.S. PATENT DOCUMENTS

| | | | | |
|---|---|---|---|---|
| 6,578,082 | B1 * | 6/2003 | Ho et al. | 709/233 |
| 7,310,312 | B2 * | 12/2007 | Shin | 370/235 |
| 2006/0268821 | A1 | 11/2006 | Terry | |
| 2007/0115817 | A1 * | 5/2007 | Gupta et al. | 370/230 |
| 2008/0225725 | A1 * | 9/2008 | Wang et al. | 370/235.1 |

FOREIGN PATENT DOCUMENTS

| | | |
|---|---|---|
| EP | 1223784 A1 | 7/2002 |
| EP | 1 986 455 A1 | 10/2008 |
| JP | 2006-352704 A | 12/2006 |
| KR | 10-2006-0131671 A | 12/2006 |
| KR | 10-2007-0018665 A | 2/2007 |
| KR | 10-2007-0117662 A | 12/2007 |
| WO | 2005055533 A1 | 6/2005 |
| WO | 2006063307 A2 | 6/2006 |

OTHER PUBLICATIONS

Notice of Allowance on corresponding foreign application (KR Application No. 10-2008-0127450) from the Korean Intellectual Property Office dated Sep. 28, 2010.
3GPP TS 36.321 V1.3.0 (Nov. 2007).
Email—E-UTRA MAC v1.3.0—from Etienne Chaponniere of Wed, Nov. 21, 2007.
3GPP TSG RAN WG2#54, Tallinn Estonia Aug. 28-Sep. 1, 2006, document R2-062656.
TSG-RAN WG 2 meeting #55, Oct. 9-13, 2006, Seoul Korea. R2-062996.
3GPP TSG RAN WG2#55. Seoul Korea Oct. 9-13, 2006. R2-062960.
TSG-RAN WG 2 meeting #56, Oct. 6-13, 2006, Riga, Latvia, R2-063339.

(Continued)

*Primary Examiner* — Mark Rinehart
*Assistant Examiner* — Matthew Hopkins
(74) *Attorney, Agent, or Firm* — Blue Capital Law Firm, P.C.

(57) ABSTRACT

A method of radio resource allocation in a wireless communication system includes allocating radio resource to a plurality of logical channels according to a grant, and allowing the plurality of logical channels to use the remaining grant when the grant remains and the plurality of logical channels having data available for transmission cannot perform resource allocation anymore.

14 Claims, 4 Drawing Sheets

(56) References Cited

OTHER PUBLICATIONS

3GPP TSG-WG2 Meeting #18. Edinburgh. Scotland, 17th-19th 2001, document R2-010182.
3GPP TSG-RAN WG2 ad-hoc. Cannes. France, Jun. 21-24, 2004. document R2-041393.
3GPP TSG-RAN WG2 #59bis. Oct. 8-12, 2007, Shanghai, China, document R2-074123.
3GPP TSG-RAN WG2 #60bis. Jan. 14-18, 2008, Sevilla Spain, document R2-080376.
3GPP TSG-RAN WG2 #60bis, Jan. 14-18, 2008, Sevilla Spain, document R2-080377.
Email-Qualcomm contributions (LTE U-Plane) from Duncan Ho of Mon, Jan. 7, 2008.
3GPP TSG-RAN2 Meeting #61, Sorrento, Italy, Feb. 11-15, 2008, R2-081389.
3GPP TSG RAN WG2 #61, Sorrento, Italy, Feb. 11-15, 2008. R2-080886.
R. Guerin et al, Quality-of-service in packet networks, basic mechanisms and directions, Computer Networks, 1999, vol. 31. pp. 169-189.
W.K. Wong et al, Token bank far queuing, a new scheduling algorithm for wireless multimedia services.
Communication of a notice of opposition on related EP Patent Application No. 08021654.2 issued on Apr. 29, 2011.
HUAWEI:"MBR and AMBR enforcement in UL", 3GPP TSG RAN2 #57, R2-070494, XP050133553, Feb. 12-16, 2007, St Louis, United States of America.
QUALCOMM Europe: "Text Proposal for UL Logical Channel Prioritization", 3GPP TSG-RAN WG2 #60, R2-075039, XP050137519, Nov. 5-9, 2007, Jeju, Korea.

* cited by examiner

METHOD OF RADIO RESOURCE ALLOCATION AND RELATED COMMUNICATION APPARATUS

CROSS REFERENCE TO RELATED APPLICATIONS

This application claims the benefit of U.S. Provisional Application No. 61/013,309, filed on Dec. 13, 2007 and entitled "Method and apparatus for Logical Channel Prioritization and Improving Contention Resolution for Loser UE in a wireless communication system", and No. 61/020,751, filed on Jan. 14, 2008 and entitled "Method and apparatus for handling status prohibit function in a wireless communication system", the contents of which are incorporated herein by reference.

BACKGROUND OF THE INVENTION

1. Field of the Invention

The present invention relates to a method of radio resource allocation and related communication apparatus, and more particularly, to a method for avoiding radio resource waste in a wireless communication system and related communication apparatus.

2. Description of the Prior Art

According to Medium Access Control (MAC) protocol specification defined by the 3rd Generation Partnership Project (3GPP), MAC layer, a lower layer of a Radio Link Control (RLC) layer, supports functions of mapping between logical channels and transport channels, multiplexing, de-multiplexing, logical channel prioritization, transport format selection, and so on. The MAC layer exchanges RLC PDUs (Protocol Data Units), namely MAC SDUs (Service Data Units), with the RLC layer via logic channels and exchanges MAC PDUs with a physical layer via transport channels, such as an uplink shared channel (UL-SCH) or a downlink shared channel (DL-SCH).

In the MAC layer, a logical channel prioritization procedure is applied when a new transmission is performed. Each logical channel is given a Prioritized Bit Rate (PBR), which is a rate like X bytes/s or Y bits/s. The logical channel prioritization procedure ensures that all the logical channels are served in a decreasing priority order up to their configured PBR.

In a word, the logical channel prioritization procedure of the MAC layer is that the logical channels transmit data to the MAC layer in a TTI according to a priority, so the data with higher priority could be transmitted early.

Further illustrate the logical channel prioritization procedure, to clearly explain resource allocation and data transmission process. When a user equipment (UE) performs uplink transmission, network of the wireless communication system allocates a grant to UE, for providing radio resource. The grant is a largest data amount allowed UE to transmit. Then, the Radio Resource Control (RRC) layer of the UE gives each logical channel a priority and a PBR, to allocate resource to each logical channel according to the decreasing priority order. The largest resource amount allocated to each logical channel cannot exceed PBR.

In addition, the prior art provides a PBR token bucket framework for calculating allowed resource amount of the plurality of logical channels. The PBR token bucket framework uses a PBR token bucket parameter and a PBR token rate. The PBR token bucket parameter is used for indicating the resource amount allowed the logical channels to use, and the PBR token rate is used for indicating the number of bytes added to the PBR token bucket parameter of the logical channel at every TTI.

At every TTI, UE executes PBR token bucket framework, including adding the PBR token rate to the PBR token bucket parameter, for increasing allowed resource amount for the logical channels, allocating resource to the logical channels with the PBR token bucket parameter larger than zero according to the decreasing priority order, and decreasing the PBR token bucket parameter and the grant according to the resource amount allocated to the logical channels.

In the prior art, when the allowed resource amount of the logical channel is insufficient (namely the PBR token bucket parameter of the logical channel is smaller than the data amount), the logical channel just can be allocated the same resource amount with the resource amount which can be used for the logical channel. Meanwhile, the PBR token bucket parameter is decreased to be zero (namely there is no resource can be used for the logical channel), so the logical channel cannot be allocated resource anymore. Therefore, if all the logical chancels having data available for transmission cannot perform resource allocation anymore, these logical channels cannot transmit data even the grant remains, which causes radio resource waste.

Note that, the RRC layer further gives each logical channel corresponding to a Guarantee Bit Rate (GBR) bearer a Maximum Bit Rate (MBR), which is a rate like X bytes/s or Y bits/s. MBR is given according different QoS services; for example, Voice over Internet Protocol (VoIP) service is a transmission by the GBR bearer.

Take the RRC layer gives each logical channel a PBR, MBR and priority as an example. According to the configured PBR, the logical channels perform resource allocation according to the decreasing priority order. Then, if the grant remains, according to the configured MBR, the logical channels perform resource allocation according to the decreasing priority order. After that, the logical channels still having data available for transmission cannot perform resource allocation anymore even if the grant remains, causing waste of radio resource.

In addition, in the prior art, besides utilizing PBR token bucket framework for calculating the allowed resource amount of each logical channel, the MBR token bucket framework is utilized for calculating allowed resource amount of the logical channels also. The MBR token bucket framework uses a MBR token bucket parameter and a MBR token rate. The MBR token bucket parameter is used for indicating the resource amount allowed the logical channels to use, and the MBR token rate is used for indicating the number of bytes added to the MBR token bucket parameter of the logical channel at every TTI.

In the prior art, UE initiates the PBR token bucket framework, and then initiates the MBR token bucket framework at every TTI. The PBR token bucket framework has been described above, so the detailed description is omitted herein. After that, UE performs the PBR token bucket framework, including adding the MBR token rate to the MBR token bucket parameter, if the grant for UE remains and logical channels still have data available for transmission, allocating resource to the logical channels with the MBR token bucket parameter larger than zero (namely added MBR token rate) according to the decreasing priority order, and decrease the MBR token bucket parameter and the grant according to the allocated resource amount. After that, the logical channels still having data available for transmission cannot perform resource allocation anymore even if the grant remains, causing radio resource waste.

As can be seen form above, after UE performs MBR token bucket framework, the logical channel prioritization procedure of the prior art does not disclose the operating method, which causes the logical channels to be incapable of allocating resource even if the grant remains. In addition, when a logical channel does not have allowed resource amount (namely the MBR token bucket parameter is zero), the logical channels cannot perform resource allocation anymore even if the grant for UE remains, causing the radio resource waste.

Therefore, in the prior art, after UE performs PBR and MBR token bucket framework, the logical channels still having data available for transmission cannot perform resource allocation anymore even if the grant remains. Since the logical channels cannot perform resource allocation, the logical channels cannot transmit data, causing resource waste. In addition, if the allowed resource amount of the logical channels is smaller than the data amount, since the logical channels need more resource for transmitting data, the data will be transmitted in different TTI. Therefore, the uplink transmission for the PDUs is delayed and affecting efficiency of the wireless communication system.

SUMMARY OF THE INVENTION

The present invention therefore provides a method of radio resource allocation in a wireless communication system and related communication apparatus, for avoiding radio resource waste.

The present invention discloses a method of radio resource allocation in a wireless communication system. The method includes allocating radio resource to a plurality of logical channels according to a grant, and allowing the plurality of logical channels to use the remaining grant when the grant remains and all the plurality of logical channels having data available for transmission cannot perform resource allocation anymore.

The present invention further discloses a communication device utilized in a wireless communication system. The communication device includes a processor for executing a program, and a storage device coupled to the processor, for storing the program which includes allocating radio resource to a plurality of logical channels according to a grant, and allowing the plurality of logical channels to use the remaining grant when the grant remains and all the plurality of logical channels having data available for transmission cannot perform resource allocation anymore.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
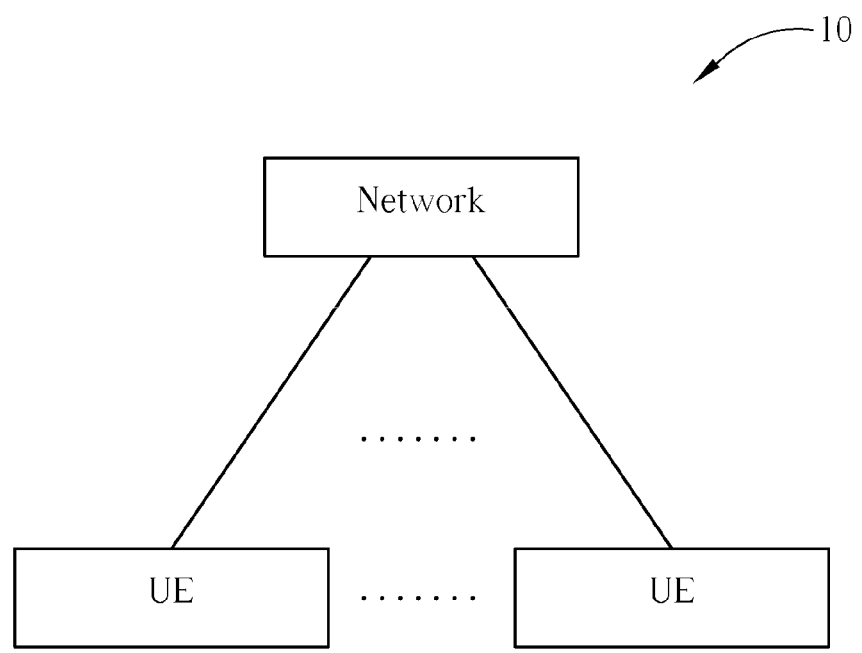
FIG. 1 is a schematic diagram of a wireless communication system.

Please refer to FIG. 1, which is a schematic diagram of a wireless communications system 10. The wireless communications system 10 is preferred to be a LTE system, and is briefly formed with a network terminal and a plurality of user equipments. In FIG. 1, the network terminal and the user equipments (UEs) are simply utilized for illustrating the structure of the wireless communications system 10. Practically, the network terminal may include a plurality of base stations, radio network controllers, and so on according to actual demands, and the UEs can be apparatuses such as mobile phones, computer systems, etc.

Figure 2:
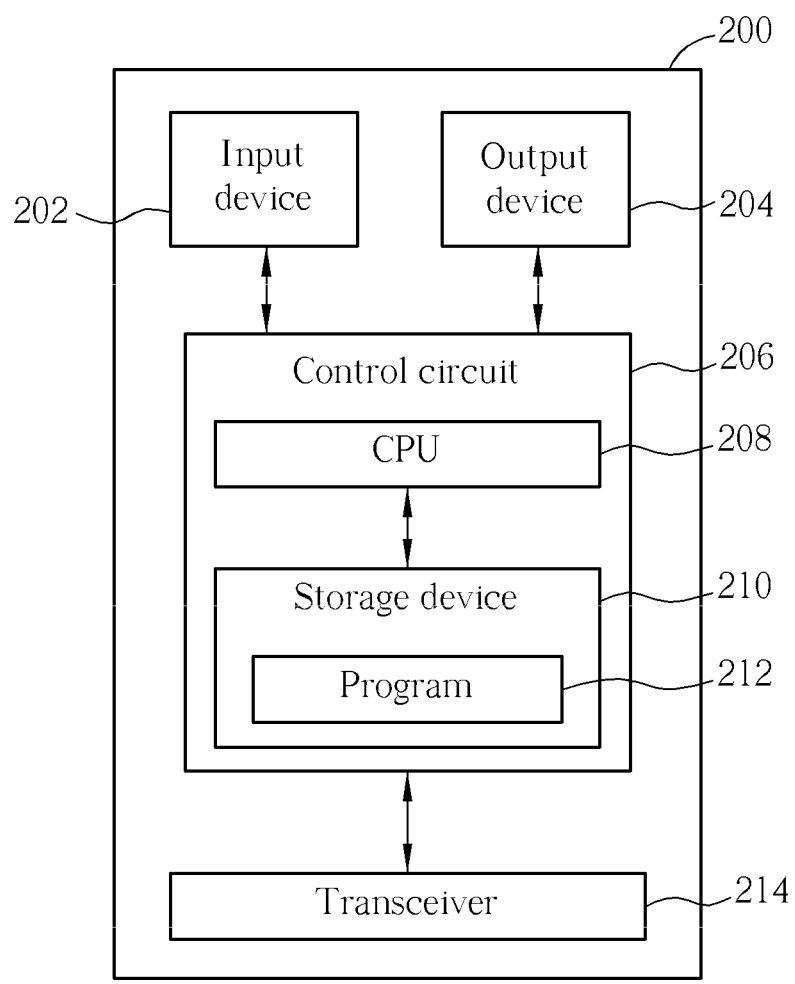
FIG. 2 is a functional block diagram of a wireless communication device.

Please refer to FIG. 2, which is a functional block diagram of a communications device 200. The communications device 200 can be a UE of the wireless communications system 10. For the sake of brevity, FIG. 2 only shows an input device 202, an output device 204, a control circuit 206, a processor 208, a storage device 210, a program 212, and a transceiver 214 of the communications device 200. In the communications device 200, the control circuit 206 executes the program 212 in the storage device 210 through the processor 208 for executing a process, thereby controlling an operation of the communications device 200. The communications device 200 can receive signals inputted by a user through the input device 202, such as a keyboard, and can output images and sounds through the output device 204, such as a monitor or speakers. The transceiver 214 is used for receiving and transmitting wireless signals, delivering received signals to the control circuit 206, and outputting signals generated by the control circuit 206 wirelessly. From a perspective of a communications protocol framework, the transceiver 214 can be seen as a portion of Layer 1, and the control circuit 206 can be utilized to realize functions of Layer 2 and Layer 3.

Figure 3:
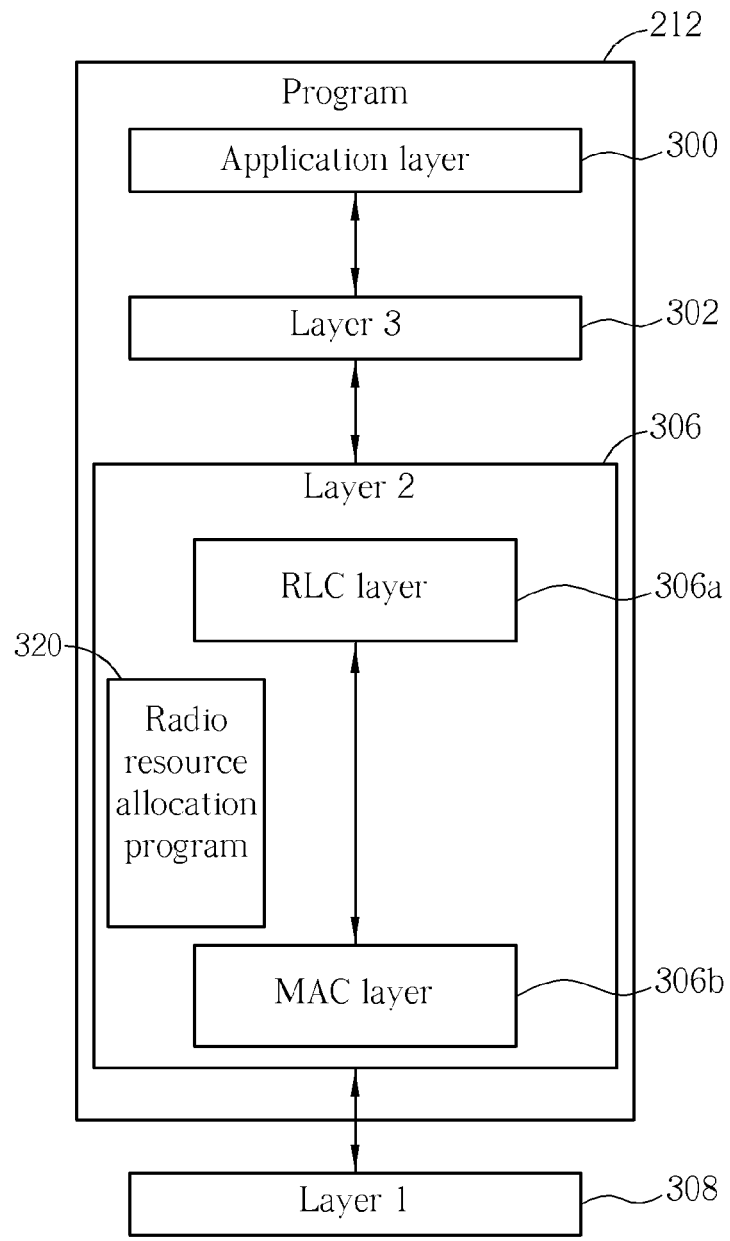
FIG. 3 is a schematic diagram of a program shown in FIG. 2.

Please continue to refer to FIG. 3, which is a diagram of the program 212 shown in FIG. 2. The program 212 includes an application layer 300, a Layer 3 302, and a Layer 2 306, and is coupled to a Layer 1 308. The Layer 2 306 includes two sub layers, a RLC layer 306a and a MAC layer 306b. The RLC layer 306a transmits messages and packets to the MCA layer 306b via a plurality of logical channels. The RLC layer 306a is utilized for processing transmission data or control command, such as segmentation, assembling and etc, according to different QoS. The MAC layer 306b is utilized for mapping packets on different logical channels into transport channels, such as common, shared, or dedicated channel according to a radio resource allocation command from the Layer 3 302 (the RRC layer), to perform processes, such as mapping, multiplexing, format selection, random access control and so on.

When the MAC layer 306b allocates resource to the RLC layer 306a for transmitting data, the MAC layer 306b initiate a logical channel prioritization procedure for transmitting data on the plurality of logical channels in order. In this situation, an embodiment of the present invention provides a radio resource allocation program 320 for the Layer 2 306, for avoiding resource waste when the plurality of logical channels of the MAC layer 306b perform radio resource allocation, to increase efficiency of wireless communication system.

Figure 4:
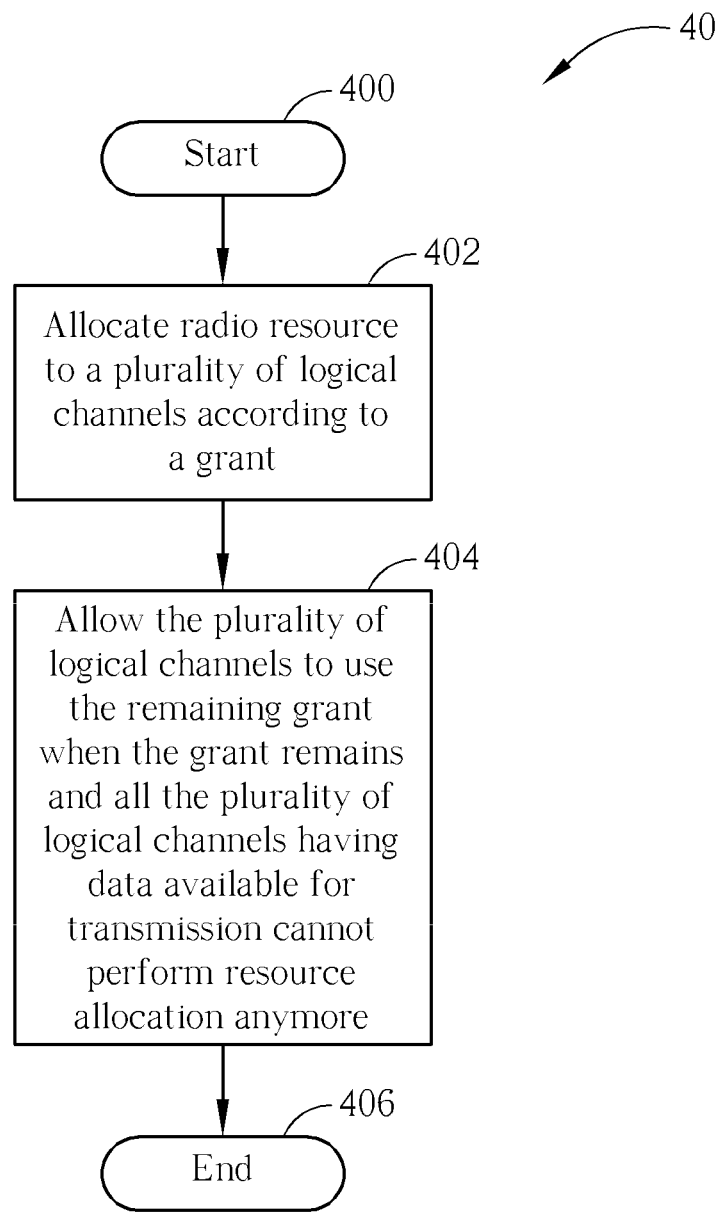
FIG. 4 is a flowchart diagram according to an embodiment of the present invention.

Please refer to FIG. 4, which is a schematic diagram of a process 40 according to an embodiment of the present invention. The process 40 is utilized in a user equipment of the wireless communication system 10 for data transmission in the logical channels. The process 40 can be compiled into the radio resource allocation program 320, and includes the following steps:

Step 400: Start.

Step 402: Allocate radio resource to a plurality of logical channels according to a grant.

Step 404: Allow the plurality of logical channels to use the remaining grant when the grant remains and all the plurality of logical channels having data available for transmission cannot perform resource allocation anymore.

Step 400: End.

According to the process 40, the MAC layer 306*b* allocates resource to the logical channels according to a priority and Prioritized Bit Rate (PBR). The resource amount for each logical channel is limited by the PBR. In addition, the grant is decreased according to the resource amount allocated to the logical channels, so the grant is a maximum amount that UE is allowed to transmit data. If the grant remains and the logical channels still have data for transmission, the embodiment of the present invention allows the logical channels to transmit data according to the decreasing priority order of the logical channels until the data or the grant exhausted.

In the process 40, the embodiment of the present invention calculates allowed resource amount of each logical channel according to a token bucket framework. The token bucket framework utilizes token bucket values, a token rate, and a bucket size. The token bucket values are used for indicating the allowed resource amount of the logical channels, the token rate is used for indicating the number of bytes added to the token bucket value of the logical channel at every TTI, and the bucket size is used for indicating the largest allowed resource amount of each logical channel.

The operation method of the token bucket framework can be concluded into five steps:

1. Calculate each of the token bucket value according to a formula:

Token Bucket Value=Min(Bucket Size,Token Bucket Value+Token Rate) in step 402;

2. Repeat step 3 and step 4 according to the decreasing priority order of the logical channels in step 402;

3. Allocate resource amount to the logical channel according to a formula:

Min(Grant,Token Bucket Value,Data Amount) in step 402;

4. Decrease the grant and token bucket value according to the resource amount allocated to the logical channel, in which the token bucket value can be zero or negative in step 402;

5. If the grant remains and the logical channels still have data for transmitting, the remaining grant is allocated to the logical channels according to the decreasing priority order until the data or the grant exhausted in step 404.

As can be seen from above, when the grant remains and the logical channels still have data for transmission, the present invention allows logical channels to be allocated resource even if the token bucket values of the logical channels are smaller or equal to zero. In other words, the logical channels can utilize resource if the allowed resource amount (namely token bucket values) is not enough at present TTI, so the logical channels can transmit data without a limitation of the allowed resource amount. In this situation, the logical channels with higher priority can transmit data early without waiting for the next TTI, so as to decrease radio resource waste, avoid data segmentation and enhance transmission efficiency of the PDUs.

Further illustrate the resource allocation of the logical channels according to the priority and PBR for the process 40. UE performs a PBR token bucket framework according to PBR given by the RRC layer. The PBR token bucket framework is used for calculating the allowed resource amount for each logical channel.

Note that, a concept of the token bucket framework can be applied to the PBR token bucket framework. Each of the toke bucket value corresponds to a PBR token bucket parameter, token bucket rate corresponds to PBR token bucket rate, and the bucket size corresponds to PBR bucket size. An operation method of the PBR token bucket framework is similar to the token bucket framework as describe above, so the detail description is omitted herein. The point is, when the grant remains and the logical channels have data available for transmission, the logical channel still can be allocated resource at the present TTI even if the allowed resource amount of the logical channels is insufficient.

In a word, in the embodiment of the present invention, after the logical channels perform PBR token bucket framework, if the grant remains and the logical channels still have data available for transmission, the logical channels can be allocated resource according to the decreasing priority order until the data or the grant exhausted. In addition, the embodiment of the present invention applies the concept of the token bucket framework to the PBR token bucket framework, avoiding the situation that a certain logical channels with PBR token bucket parameter equal to zero cannot transmit data. Therefore, the embodiment of the present invention can prevent resource waste, increase speed of data transmission, and enhance communication quality. In comparison, in the prior art, when the grant remains and the logical channels still have data available for transmission, the logical channels cannot transmit data because the PBR token bucket parameter of the logical channels needs to be greater than zero for resource allocation, causing certain logical channels to wait the next TTI for transmitting data; thus, the data transmission is delayed, and the communication quality is reduced.

Furthermore, according to the process 40, the logical channels of the MAC layer 306*b* allocate resource according to the priority, the PBR, and Maximum Bit Rate (MBR). The resource amount for each logical channel is limited by the PBR and MBR. UE performs the PBR token bucket framework, and then performs a MBR token bucket framework, wherein the operation method of the PBR token bucket framework is according to the token bucket framework steps 1 to 4, and can be referred from above. Similarity, the concept of the token bucket framework can be applied to the MBR token bucket framework, so the logical channel can transmit data, to utilize radio resource effectively. The toke bucket value, token bucket rate and the bucket size respectively correspond to MBR token bucket parameter, MBR token bucket rate, and MBR bucket size. An operation method of the MBR token bucket framework is similar to the token bucket framework, so the detailed description is omitted herein.

In conclusion, if the grant remains and the logical channels still have data available for transmission, the embodiment of the present invention allows the logical channels to use the remaining grant when the logical channels cannot perform resource allocation, to avoid radio resource waste. In addition, the embodiment of the present invention provides a concept of the token bucket framework. When allowed resource amount of a logical channel is insufficient, the logical channel still can be allocated resource at the present TTI, to enhance the speed and efficiency of data transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of radio resource allocation in a wireless communication system comprising:
    allocating radio resource to a plurality of logical channels according to a grant;

decreasing a token bucket value of a logical channel of the plurality of logical channels by the radio resource amount allocated to the logical channel; and allowing the plurality of logical channels to use the remaining radio resource when the radio resource remains and the token bucket values of all of the logical channels having data available for transmission are negative or equal to zero.

2. The method of claim 1, wherein the token bucket value is corresponding to a Prioritized Bit Rate (PBR), which is corresponding to a largest data amount allowed to be transmitted in a Transmission Time Interval (TTI) on a first logical channel.

3. The method of claim 1, wherein the token bucket value is corresponding to a PBR token bucket parameter.

4. The method of claim 1, wherein the token bucket value is corresponding to a Maximum Bit Rate (MBR), which is corresponding to a largest data amount allowed to be transmitted in a TTI on a first logical channel.

5. The method of claim 1, wherein the token bucket value is corresponding to a MBR token bucket parameter.

6. The method of claim 1, wherein allowing the plurality of logical channels to use the remaining radio resource is allocating the remaining radio resource to the plurality of logical channels according to a decreasing priority order of the plurality of logical channels until either the data or the remaining radio resource is exhausted.

7. The method of claim 1, wherein after allocating the remaining radio resource to a second logical channel of the plurality of logical channels, the token bucket value of the second logical channel is decreased by the remaining radio resource amount allocated to the second logical channel.

8. A communication device utilized in a wireless communication system, the communication device comprising:
a processor for executing a program; and
a storage device coupled to the processor, for storing the program;
wherein the program comprises:

allocating radio resource to a plurality of logical channels according to a grant;

decreasing a token bucket value of a logical channel of the plurality of logical channels by the radio resource amount allocated to the logical channel; and allowing the plurality of logical channels to use the remaining radio resource when the radio resource remains and the token bucket values of all of the logical channels having data available for transmission are negative or equal to zero.

9. The communication device of claim 8, wherein the token bucket value is corresponding to a PBR, which is corresponding to a largest data amount allowed to be transmitted in a TTI on a first logical channel.

10. The communication device of claim 8, wherein the token bucket value is corresponding to a PBR token bucket parameter.

11. The communication device of claim 8, wherein the token bucket value is corresponding to a MBR, which is corresponding to a largest data amount allowed to be transmitted in a TTI on a first logical channel.

12. The communication device of claim 8, wherein the token bucket value is corresponding to a MBR token bucket parameter.

13. The communication device of claim 8, wherein allowing the plurality of logical channels to use the remaining radio resource is allocating the remaining radio resource to the plurality of logical channels according to a decreasing priority order of the plurality of logical channels until either the data or the remaining radio resource is exhausted.

14. The communication device of claim 8, wherein after allocating the remaining radio resource to a second logical channel of the plurality of logical channels, the token bucket value of the second logical channel is decreased by the remaining radio resource amount allocated to the second logical channel.

\* \* \* \* \*